Jan. 29, 1929.                                                          1,700,642
W. MEINDERSMA
APPARATUS FOR INDICATING AND DETERMINING THE POINT
OF ENTRANCE OF FLUIDS IN BOREHOLES
Filed Oct. 20, 1927
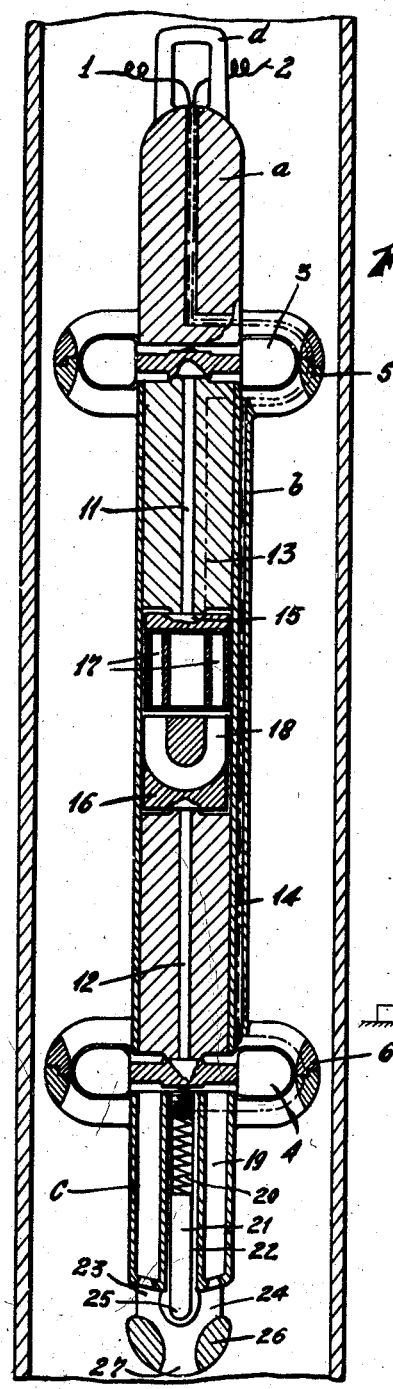
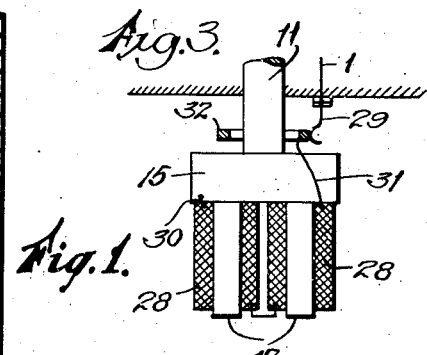
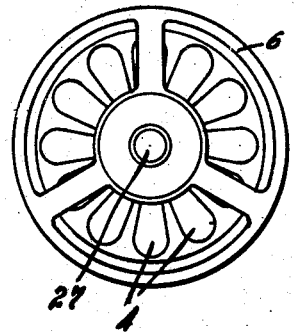
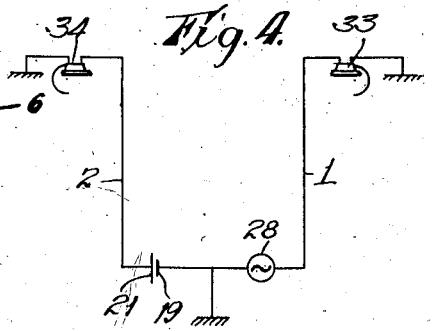
Inventor:
Wigger Meindersma
By
Attorney.

Patented Jan. 29, 1929.

1,700,642

UNITED STATES PATENT OFFICE.

WIGGER MEINDERSMA, OF WASSENAAR, NETHERLANDS.

APPARATUS FOR INDICATING AND DETERMINING THE POINT OF ENTRANCE OF FLUIDS IN BOREHOLES.

Application filed October 20, 1927, Serial No. 227,587, and in the Netherlands October 20, 1924.

This invention relates to a device for indicating and determining the fluids in a borehole and particularly to a device which by its own action, produces an electric current which, may be amplified or not, may be conveyed through telephone receivers or may be employed for operating recording devices, loud speakers or the like.

According to the invention this object is attained by providing the device with two spaced propellers which may be set in motion by means of flowing fluids and which are associated with a coil and a magnetic field in such a manner that a variation in the relative motion between said propellers due to a difference in the speed with which the fluid flows along the said propellers produces an induction current which may be detected by a telephone receiver. The propellers may be replaced by other propellers corresponding with the diameter of the bore hole or the casing. Finally, the device may be provided with two cartridges of a composition such that, together with the fluid in the bore-hole, they constitute a galvanic cell in which a change of the fluid causes variations in the electromotive force, which variations may be detected by means of a telephone receiver.

In this manner a simple mechanical device is obtained for examining the entry of fluids into a bore-hole and for determining the nature of the said fluids.

An embodiment of the invention is illustrated in the accompanying drawing, in which;

Figure 1 is a longitudinal sectional view of the improved device or implement;

Fig. 2 is a bottom view thereof;

Fig. 3 shows a detail of Fig. 1 on an enlarged scale;

Fig. 4 is a diagram of the wiring.

Referring more particularly to Fig. 1, the device or implement is represented as comprising three main parts $a$, $b$ and $c$ which are coupled together by pairs of oppositely-curved, spider-like members 5 and 6 having inter-engaging shouldered edges; the upper part $a$ being formed with a bore through which the two conductors or leads 1 and 2 are inserted, and carrying a suspension member $d$ at its top.

The middle part $b$ consists of two independently-rotatable units, one comprising two series-connected coils 28 (best shown in Fig. 3) wound on iron cores 17 carried by a base member 15 which is attached to the lower end of a shaft 11, the upper end of which has a propeller 3 secured to it; while the other unit comprises a permanent magnet 18, a carrier 16 therefor fixed to the upper end of a shaft 12, and a propeller 4 attached to the lower end of the latter shaft. The propellers 3 and 4 are disposed within the double spiders 5, 6 and have a diameter such that their blades project beyond the body of the implement.

Finally, the lower part $c$ is formed with two concentric compartments 19 and 22 adapted to receive substances in suitable form which, on coming in contact with water, either salt or fresh, will constitute a galvanic cell and so generate an electric current which is conducted through the lead 2. The substance contained in the inner compartment 22 is shown as in the form of a cartridge, designated 21, which is forced downward by a spring 20 (Fig. 1) into a central pocket or recess 25 provided in a head 26 that is secured to the lower end of part $c$; said head being also provided with apertures 23, 24 and 27 for admission of water to recess 25, the apertures 23 and 24 registering with openings formed in the bottom of compartment 19. In this way, the water admitted through the several openings is enabled to reach the substances in both compartments, thus acting as an electrolyte to bridge the same and thereby close a circuit.

The substances referred to may, for instance, consist of an amalgam of an alkali metal for the negative pole and an oxygen-releasing compound, such as lead peroxide ($PbO_2$), for the positive pole. One of said substances—in the construction illustrated, the cartridge 21—is electrically connected with the conductor or lead 2 through the intermediary of spring 20, and is insulated from the body of the device or implement itself, while the other substance is grounded through the implement and the metal hoisting cable (not shown) from which said implement is suspended by means of the part or member $d$.

As previously stated, the coils 28 carried by the cores 17 (Fig. 3) are connected in series. The free end of one coil is connected at 30 to the base member 15 secured to shaft 11, and the latter is provided with a slip-ring 32 which is engaged by a brush 29 whereto the other main conductor or lead 1 is attached. The terminal 30 is grounded through base 15, the body of the implement and the metal suspension cable mentioned above, and the slip-ring 32 is suitably insulated from shaft 11 and has connected to it the other terminal 31 of the coil. In consequence, a relative rotary motion between the two propellers 3 and 4 will produce a similar movement between the coils 28 and the permanent magnet 18, and that, in turn, will generate an electric current in said coils, which is collected by brush 29 and conveyed through lead 1. Instead of the permanent magnet, however, current generators of other types can be used; for instance, a microphone, in which the relative movement of the propellers 3 and 4 produces a vibration of the diaphragm of the microphone, thereby actuating a telephone included in the circuit.

Fig. 4 shows diagrammatically the passage of the current; that produced in the coils 28, which latter are indicated therein as a generator, flowing through lead 1 and telephone 33 to ground, while the current generated by the galvanic cell passes through lead 2 and telephone 34 to ground. Both telephones may, if desired, be united to form a double head-set; but other suitable current indicating or current recording apparatus may be used in place of telephones.

In operation, the implement is lowered into a casing or bore-hole filled with liquid, during which time the two propellers 3 and 4 will be rotated at the same speed, with the result that no current is generated. When, however, a point is passed where liquid is entering the hole or casing, then the flow of the liquid through the upper propeller 3 will be more intense than through the lower propeller 4, and a relative rotation between the two will then take place, with the result that current is generated in circuit 1 in the manner above explained. Any point or zone of entrance of liquid into the bore-hole may in this way be determined, since the depth is known from the unwound cable. The two poles constituted by the substances in compartments 19 and 22 will form a galvanic cell only when coupled by an electrolyte; not when coupled by oil. Fresh water, when forming the electrolyte, will give a current of definite intensity, which is less than that produced by salt water, so that the nature of the liquid can thus be determined; an observer having some experience being enabled to ascertain readily what takes place in the bore-hole. It will be apparent, however, that the invention as described above, is not restricted to use in bore-holes but may also be applied as a measuring instrument to any kind of tube system.

What I claim is:

1. An implement to indicate the entry of liquids into a bore-hole, comprising a body adapted to be lowered into the bore-hole; a pair of spaced propellers carried by said body to be set in motion by the flow of liquids in the bore-hole and capable of independent relative rotation; cooperating means carried by the two propellers for setting up an induced current consequent upon such rotation; and conducting means for leading such current to its point of use.

2. An implement according to claim 1, in which the body of the implement consists of a plurality of axially-alining sections, the mutually-adjacent edges of which are connected together by pairs of oppositely-curved, spider-like members having interengaging shouldered edges, the propellers being disposed within the interior of said pairs of interengaged members.

In testimony whereof I affix my signature.

WIGGER MEINDERSMA.